2 Sheets—Sheet 1.

W. K. SAWYER.
DEVICE FOR FASTENING THE LEGS OF A TABLE.

No. 171,322.  Patented Dec. 21, 1875.

Witnesses:  
Elten D Wilcox  
Henry Keifer

Inventor:  
William K Sawyer.

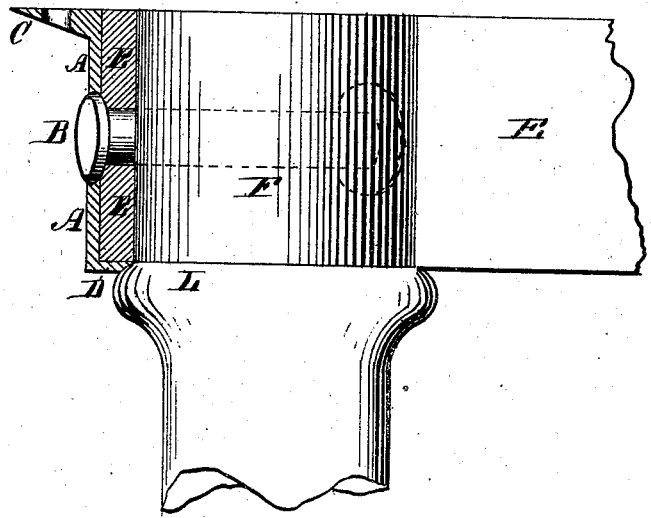

UNITED STATES PATENT OFFICE.

WILLIAM K. SAWYER, OF THREE OAKS, MICHIGAN.

IMPROVEMENT IN DEVICES FOR FASTENING THE LEGS OF A TABLE.

Specification forming part of Letters Patent No. 171,322, dated December 21, 1875; application filed August 8, 1873.

*To all whom it may concern:*

Be it known that I, WILLIAM K. SAWYER, of Three Oaks, in the county of Berrien and State of Michigan, have invented a new and useful improvement on furniture-fasteners for fastening together tables, bedsteads, stands, and other frames; and I do hereby declare that the following is a true and exact description thereof, reference being had to the accompanying drawing making a part of this specification, in which—

Figure 1:
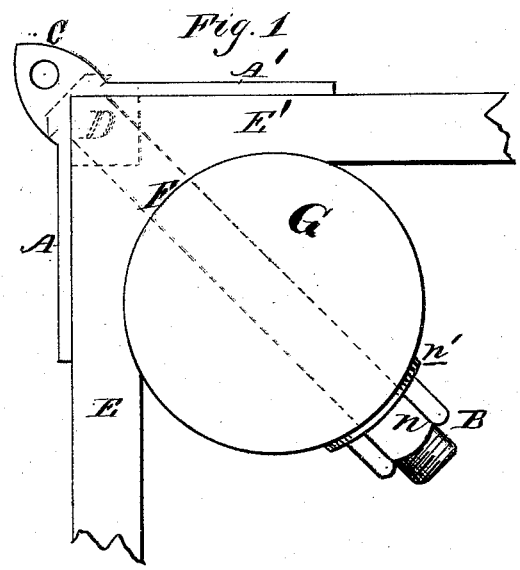
Figure 2:
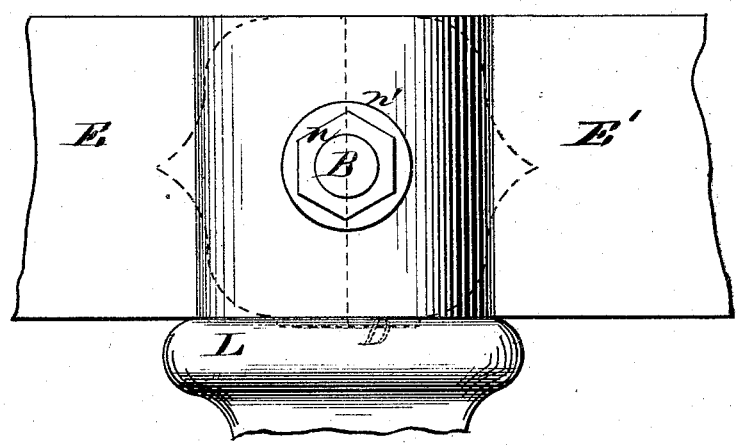

Figure 1 represents a plan view of the device with my improvement. Fig. 2 represents the inside of a table-corner, showing my fastener on duty; and Fig. 3 is a detail, showing a table-leg adapted for use with my fastening apparatus. I sometimes, however, construct the leg in a square form where it joins the rails, the rails being grooved to fit.

This invention has relation to improvements in clamps, which are designed to rigidly secure the table-frame and legs together by means of a bolt passing through the said clamp, table-frame, and the legs; and the nature of the invention consists in an angular metallic plate, adapted to fit snugly over the angles of the table-frame, and having upon its lower end an inwardly-projecting lip or flange, upon which the side and end rails rest, and an outwardly-projecting lip or flange upon its outer edge, adapted to be rigidly secured to the table-top by means of suitable screws, whereby the table-frame is effectually braced against downward displacement, being supported from the top, when the said clamp-plate is passed over the ends of the side and end rails of a table-frame, and is clamped thereon by means of a bolt passing through the said plate in between the joint of the side and end bars, and through the table-leg, as will be hereinafter more fully explained.

In the annexed drawings, A A' designate the two wings of an angular metallic plate, having upon its upper edge, and at the angle of its wings, an outwardly-projecting flange or lip, C, and upon its under side, and projecting inwardly from the said angle, a shelf or supporting-lip, D. This plate is preferably made of metal; but I may cause it to be made of wood, and, whether of metal or of wood, may be of any desired degree of ornamentation, and it may be of any form suited to conform to the joint of the table-frames, which, as is well known, are sometimes rectangular, oval, or circular. The angle of the rails E E' of the table-frame is recessed to receive the upper end of the table-leg G, and the frame having been put together, a bolt, B, (shown in dotted lines, Fig. 1,) is passed through a perforation in the angle of clamp-plate A A', into a perforation made into and between the ends of the side and end rails of the said frame, extending through table-leg G, as shown in Fig. 1. A washer, $n'$, is then passed over the projecting screw-threaded end of the said bolt, and a nut, $n$, forcibly set up thereon, rigidly clamping the rails of the table-frame against each other and against the upper end of the table-leg, and securing a strong and reliable union of the parts. In this position inwardly-projecting lug D serves as a supporting-shelf for side and end rails E E', which rest thereon. They are thus prevented from downward displacement relative to each other, so that the upper horizontal edges of the table-frame are at all times maintained on a level—that is to say, flush with each other, and the table-top afforded proper support.

With the view to still further brace the frame of the table, a screw is passed upward through a perforation in lug C, and is forced into the under side of the table-top, thus causing the latter to brace the table-frame against wabbling, and holding the clamp-plate against casual vertical displacement.

I am aware that a metallic clamp for joining the frame and leg of a table has heretofore been employed, having a socket for receiving the leg and wings, provided with claws for receiving the table-rails, and perforated lips for attaching the top of the table to its frame, as shown in Letters Patent granted to S. Oppenheimer, dated August 7, 1866, No. 56,986, and therefore I lay no claim to such invention.

On the 10th day of September, 1872, Letters Patent, numbered 131,304, were granted to me for a furniture-fastener, consisting of a clamp or fastener for uniting the corners of tables, bedsteads, and other articles of furniture, which furniture-fastener is constructed with flanges at right angles to each other, to which are connected arms for embracing the legs of a table, provided with a slot and set-screw, and perforated lugs for connecting the top to the frame of the table. This construction requires the side and end rails to be slotted for the reception of the arms, which weakens them materially; and it also requires that the upper ends of the legs of the table should be fitted into the space between the arms and the flanges. This fastening also is not so secure as the screw, as it does not pass entirely through the leg; and it is more expensive than my present invention, in which I dispense with the arms.

I do not desire in this application to cover any of the devices claimed in the above Letters Patent, which, so far as this application is concerned, are hereby disclaimed.

What I claim as new, and desire to secure by Letters Patent, is—

The combination of the clamp-plate A A', having shelf D and perforated lug C, the rails E E', leg G, and bolt F, having nut $n$, as described, and for the purpose set forth.

WILLIAM K. SAWYER.

Witnesses:
ELTON S. WILCOX,
HENRY KEEFER.